United States Patent Office 3,784,488
Patented Jan. 8, 1974

3,784,488
PROCESS AND COMPOSITIONS FOR PREPARING UNIQUE FILMS HAVING A MULTIPLICITY OF VOIDS AND AN ORGANIC MATERIAL CONTAINED THEREIN
Alfred F. Steinhauer and Otis R. McIntire, Midland, Mich., assignors to The Dow Chemical Company, Midland, Mich.
Continuation-in-part of abandoned application Ser. No. 799,873, Feb. 17, 1969. This application Feb. 14, 1972, Ser. No. 225,994
Int. Cl. C08j 1/14
U.S. Cl. 260—2.5 M     22 Claims

ABSTRACT OF THE DISCLOSURE

Novel film forming solution compositions which contain a high level of a non-volatile liquid organic compound in proportion to the film forming polymer are capable of forming unique coherent films having a multiplicity of voids which contain therein the organic compound. Important to obtaining the unique films of the invention is the requirement that the polymer be insoluble in the organic compound and immiscible therewith and be more soluble in the solvent than the organic compound.

CROSS REFERENCES

This application is a continuation-in-part of copending application Ser. No. 799,873, filed on Feb. 17, 1969 and now abandoned.

BACKGROUND OF THE INVENTION

This invention relates to novel films having a multiplicity of voids for retaining therein at least one non-volatile liquid organic compound and to compositions and methods for preparing same. The compositions and films are unique in that they contain high levels of the organic compound in proportion to the film forming polymer.

Generally, film forming compositions consist predominantly of a resin or a polymeric film forming material in solution, emulsified, etc., and are designed to produce a continuous film which acts as an environmental barrier or protection for the substrate to which it is applied. Additives incorporated into the film forming compositions are selected to impart a variety of characteristics to the film, such as flexibility by the addition of plasticizers and the like, but the additives are selected so as to be compatible with the film former and to produce a homogeneous continuous film. Frequently, for decorative purposes, the compositions also contain dispersed pigments such as in house paints and the like.

It is highly desirable in a great many instances to incorporate large amounts of a non-volatile liquid organic compound into a filmiform layer in such a manner that it is retained therein but is not prevented from functioning in its normal manner. According to this invention, the above highly desirable results can be obtained and it has been found that the film additionally serves to prevent loss of the organic compound by washing away or by absorption by the substrate. Frequently where the organic compound might normally impart an oily or greasy feel when applied without the film former, this greasy feel is not found or at least is greatly diminished when the film formers of this invention are utilized. One particular area where the above is desirable is products which are designed to be applied to the skin.

Various types of skin care products have been described such as a skin protective cream for use against contact dermatitis in U.S. 2,698,824; a dressing for wounds, which essentially is a plasticized film of polymethyl methacrylate, in U.S. 2,624,690; and additional disclosure of surgical dressings can be found in U.S. 2,804,073, U.S. 3,269,903 and U.S. 2,870,129. Various additives to the compositions have been suggested, principally bactericidal agents and the like, however very minor proportions of such additives in proportion to the film forming components were utilized and continuous films were produced. U.S. 3,485,915 describes various topical formulations using varying proportions of additives to the film forming polymers but film structures according to this invention are not produced.

Porous bodies containing liquids in the pores have been prepared by such simple techniques as soaking a foam in a liquid to fill the pores, much like a sponge soaking up water. Various fusion techniques have been employed such as is described in U.S. 3,017,372, U.S. 3,303,146 and U.S. 3,427,277. A solvent process for making a porous body is described in U.S. 3,450,650 which relies on a different rate of evaporation of two volatile materials.

SUMMARY OF THE INVENTION

Accordingly, this invention relates to a novel solution composition comprising a film forming polymer and at least one non-volatile liquid organic compound dissolved in a volatile mutual organic solvent wherein the polymer is insoluble in the organic compound and immiscible therewith and is more soluble in said solvent than the organic compound and wherein the composition contains from about 1 to 20 total parts by weight of the organic compound (or compounds) per each part of the polymer. The compositions have the unique ability, even with a large proportion of organic compounds with respect to the polymer, of forming a coherent film having a multiplicity of voids containing and capable of retaining therein the organic compound.

ILLUSTRATION OF THE INVENTION

In order that the invention may be more fully understood and because words are inadequate to fully describe the nature of the film produced, the following scanning electron microscope photographs are presented to illustrate the invention and to distinguish the invention over the art.

FIG. 7 is a photograph (1500×) of a film similar to

FIG. 1 in which a commercial acrylic polymer was used;

DETAILED DESCRIPTION OF THE INVENTION

The compositions of this invention are solutions prepared from three essential components, each of which must have certain charatceristics and be present in certain proportions which may vary depending on the particular combination of materials, in order to provide the unique film characteristics disclosed herein. The essential components include (1) a film forming polymer, (2) a nonvolatile liquid organic compound, and (3) a volatile mutual organic solvent. In addition, the polymer must be insoluble in the organic compound and immiscible therewith and be more soluble in the solvent than the organic compound.

A unique feature of the compositions is the weight proportions of organic compound(s) to polymer which may vary from 1:1 to 20:1, respectively. Preferably, the weight ratio varies from 1:1 to 10:1. The concentration of the polymer in the solution may vary from as little as 0.25 weight percent up to 10 percent and even higher. It is to be understood that the concentration of the polymer and the proportions of organic compound will depend upon the choice of the solvent and the solubility of each therein keeping the above stated proportions in mind. For certain uses such as cosmetic formulations, it is preferred to use a polymer concentration of about 0.25 to 3 weight percent. In contrast to this invention the art is more familiar with film forming solutions in which the polymer is the predominant or major component and the film produced is a continuous film.

The polymer component may be any film forming organic polymer which is capable of producing a continuous coherent film from a solution of the polymer in a suitable solvent therefor upon evaporation of the solvent at ambient conditions of temperature and pressure.

Any organic compound may be used in this invention which under said ambient conditions is non-volatile and remains as a liquid in the voids of the film after evaporation of the solvent. Preferably, the organic compound is one having a desirable property which may be effectively utilized in the unique films of this invention, such as a sunscreen agent (ultraviolet light absorber). The polymer and the organic compound must be selected so as to correspond to the above described interrelationships and proportions.

Any volatile organic solvent may be employed. In some instances a mixture of volatile solvent may be desirable and in certain other instances a mixture of water and a water soluble organic solvent such as an alcohol may be advantageous. Formulations of the invention intended for application on skin should employ a non-toxic solvent, of course.

A wide variety of film forming organic polymers are known and many are available in commercial quantities. One of the more widely known methods of preparing such polymers is by free radical addition polymerization of vinyl monomers by the well-known techniques of bulk, solution or emulsion polymerization or the like. Generally, emulsion and solution methods are preferred. Many patents, books and technical publications are available which describe methods of polymerization and the many hundreds of combinations of monomers which may be employed, for example "Monomeric Acrylic Esters" by Ribble, Reinhold Publishing Co., 1954.

Films of all degrees of flexibility and softness can be obtained by varying the monomer or monomers which are employed to prepare the film forming polymer and by varying the proportions of monomers. Generally it is preferred to employ more flexible film forming polymers. Monomers conducive to forming softer or more flexible film forming polymers include primary and secondary alkyl acrylates of 1 to 12 and more carbon atoms and primary and secondary alkyl methacrylates having 5 to 12 or more carbon atoms, vinyl acetate, conjugated dienes (e.g., copolymers of styrene and butadiene) and the like. Harder films are obtained by employing monovinyl aromatic monomers such as styrene and the like, alkyl methacrylate of 1 to about 4 carbon atoms such as methyl methacrylate, acrylonitrile, vinyl chloride and the like. Many copolymers prepared from various mixtures of the above monomers contain a third monomer such as acrylic or methacrylic acid, fumarate half esters and diesters, maleate half esters and diesters and the like. The molecular weight of the film forming polymers may vary over a wide range depending on the choice of monomers and the method of preparation selected. The molecular weight need only be high enough to provide integrity to the film formed from the polymer. No upper limit to molecular weight exists except for a practical limit based on insolubility in the solvent at the desired concentration or the development of excessive viscosity. The above description is not intended to be exhaustive but to briefly set forth the nature of this well developed art.

Especially preferred film forming polymers include clude those that have about 5 to 30 weight percent of a carboxylic acid group (—COOH) since such polymers are especially useful in preparing cosmetic formulations where removability by washing with soap and water is a desirable feature.

Acrylic interpolymers containing from about 5 to 30 weight percent of carboxylic acid groups (—COOH) are especially suitable for preparing the formulations and films of this invention. The preparation of such polymers is well known and they are prepared from saturated alkyl and cycloalkyl esters of acrylic or methacrylic acid and a vinyl carboxylic acid monomer. Such esters include the methyl, ethyl, butyl, octyl, cyclohexyl and the like esters and acid monomers such as acrylic acid, methacrylic acid, itaconic acid, maleic acid, aconitic acid and the like.

Another group of polymers containing carboxylic acid groups include copolymers of alkyl half esters of unsaturated dicarboxylic acids with a variety of monomers including monovinyl aromatic monomers such as styrene, α-methyl styrene, vinyl toluene, etc., e.g. a styrene-ethyl acid maleate copolymer. Additionally said half ester copolymers may be prepared to contain acrylonitrile, vinyl acetate, lower alkyl esters of acrylic or methacrylic acid, vinyl ethers and like monomers. Advantageously, the half ester copolymers may be prepared by esterifying a copolymer of an unsaturated dicarboxylic acid anhydride such as styrene-maleic anhydride. Useful anhydrides include maleic anhydride, itaconic anhydride, citraconic, aconitic anhydride and the like. Said half esters include alkyl and cycloalkyl esters similar to those previously recited.

The unique ability of the compositions of this invention to form films having a multiplicity of voids, a substantial portion of which contain the organic compound, allow for great improvement in many useful products by retaining on the skin or substrate relatively large amounts of the organic compound in proportion to the polymer and retaining the organic compounds for much longer periods of time even when subjected to a variety of exposure or environmental conditions. For example, commercial sunscreen lotions are effective for only relatively short periods of time because the sunscreen agents are lost by absorption into the skin, by washing away if the person goes swimming, etc. Sunscreen lotions prepared according to this invention retain the sunscreen agents more effectively on the skin for longer periods of time even when exposed to water. Additionally the films do not have a greasy or oily feel and are not tacky (less tendency to pick up dirt, sand, etc.).

The invention is especially useful when the organic compound possesses at least one useful property quite unrelated to the properties of the film itself. For example, in the area of products designed to be applied to the skin, organic compounds may include materials such as sunscreen oils (ultraviolet light absorbers), perfumes, essential oils, emollients, medicinal compounds, deodorants, analgesics, insect repellants, tanning agents, bactericidal and biocidal agents and the like.

The organic compound selected may have functional purposes other than for application to the skin and may be selected for application to plants, animals, and other substrates such as leather, wood, paper, metals and the like. An essential characteristic is that the organic compound must be essentially a non-solvent and a non-plasticizer for the polymer. In addition, the organic compound must be less soluble in the solvent than the polymer and when water is employed as part of the mutual solvent the organic compound should also be water insoluble. Additional organic compounds may therefore include pesticides, insecticides, fungicides and the like.

The improvements and benefits obtainable with this invention can be illustrated by certain sunscreen formulations which were prepared from an acrylic interpolymer comprising in polymerized form 20 parts of ethyl acrylate, 20 parts of methyl methacrylate, 35 parts of methyl acrylate and 25 parts of methacrylic acid. The acrylic interpolymer contained about 13.2 percent by weight of a carboxylic acid (—COOH) group.

The acrylic interpolymer was prepared by charging to a 3-necked round bottom flask equipped with a stirrer, reflux condenser, thermometer, nitrogen gas inlet, monomer inlet and an aqueous feed inlet the following:

825 gms. deionized water
0.4 gm. of a 30 percent solution of Emulsifier 104 (sodium lauryl sulfate)
0.6 gm. $N_2S_2O_8$ (0.2 percent based on monomer)
0.85 gm. $NaHCO_3$ (0.28 percent based on monomer).

The solution was heated with stirring under a blanket of nitrogen to 70° C. A monomer feed was then started at the rate of 75 gms. per hour and added over a 4 hour period. The monomer mixture contained 105 gms. methyl acrylate, 60 gms. ethyl acrylate, 60 gms. methyl methacrylate and 75 gms. methacrylic acid. One-half hour after the monomer feed was started an aqueous solution of 70 ml. of deionized water and 10 gms. of the 30 percent Emulsifier 104 solution was fed to the flask at a rate of 30 gms. per hour over a period of 2.7 hours. The temperature was maintained at 70° C. The initial pH of 7.1 dropped to 3.5 shortly after starting the monomer feed and remained thereat. The resulting latex contained 23.8 percent solids and had a particle size of about 1500 A. The latex would be employed as produced or the polymer could be recovered and dissolved in the mutual solvent.

No special techniques are needed to prepare the compositions of this invention except that when certain optional ingredients are added, such as thickening agents, a preferred order of addition of ingredients may be beneficial.

EXAMPLE 1

The resistance of two sunscreen formulations to water exposure was tested by marking a 2 x 8 inch area on the anterior forearm of a subject and 0.3 ml. of a test formulation was spread evenly over the marked area and air dried. The amount of sunscreen agent after air drying and then after exposure to a water spray (77–82° F.) for 20 minutes was determined and the loss of sunscreen agent calculated.

The amount of sunscreen agent was determined in the following manner: a 4 dram bottle containing 10 mls. of 2B absolute ethanol was uncapped and the open end placed against a portion of the marked area carefully to avoid spillage or slippage; with the ethanol in contact with the treated surface, the bottle was gently vibrated for 30 seconds to facilitate dissolution of the film. Then the bottle was removed carefully from the extracted spot, and the bottle finally recapped and set aside. This operation was repeated one to two times more. The alcohol extracts were then analyzed by ultraviolet absorption analysis to determine the presence of the sunscreen agent. The procedure was repeated after the water exposure test to determine the amount of sunscreen agent lost.

Sun Screen Formulation 1 was prepared to contain, in weight percent, the following:

|  | Percent |
|---|---|
| Acrylic interpolymer | 2 |
| Homomenthyl salicylate | 7 |
| Amyl-p-dimethylaminobenzoate (Escalol 506) | 0.5 |
| Isopropyl palmitate | 1.3 |
| N,N-diethyltoluamide | .07 |
| Dow Corning Fluid 473 (a glycol polysiloxane) | 0.47 |
| Carbopol 940 (a carboxy polymethylene polymer) | 0.5 |
| Di-2-ethylhexyl amine | 0.5 |
| Water | 9.5 |
| Ethyl alcohol (SDA–40) | 78.16 |

The above formulation contains a thickening agent (Carbopol 940) which is dissolved with all the other ingredients except the amine. After solution is complete, the amine is then added to neutralize the thickening agent.

Sun Screen Formulation 2 was prepared to contain, in weight percent, the following:

|  | Percent |
|---|---|
| Acrylic interpolymer | 1 |
| Homomenthyl salicylate | 7 |
| Escalol 506 | 0.5 |
| Carbopol 940 | 0.5 |
| Di-2-ethylhexyl amine | 0.5 |
| Water | 7 |
| Ethyl alcohol | 83.5 |

Additionally, a commercial sunscreen lotion, Coppertone, was also used for comparison in these tests. The results of the arm tests are tabulated below.

|  | Absorbence, average | | Percent loss |
|---|---|---|---|
|  | Before | After |  |
| Formulation 1 | 0.63 | 0.42 | 33 |
| Coppertone | 0.53 | 0.08 | 85 |
| Formulation 2 | 0.39 | 0.23 | 44 |
| Coppertone | 0.26 | 0.03 | 88 |

A significant improvement in the retention of the suncreen agents with the formulations of this invention is evident. Similar results to the above were also found when the formulations were tested under actual swimming conditions. Additionally, the dried film was not oily to the touch and could be readily removed by washing with soap and water.

EXAMPLE 2

Another series of tests were made to evaluate the retention of the sunscreen agents upon exposure to water in which protection against sunburn was determined. After showering under standarized conditions each of the subject's backs was marked into three sections and three different lotions were applied to each area.

After drying for about 15 minutes the subjects then showered for 10 minutes and then exposed the areas to sun lamps for 15–18 minutes. The lamps used were mercury vapor sun lamps which produced ultraviolet radiation and some infrared radiation. The lamp was placed about one foot away from the subject's back which had been covered with a protective piece of fabric, sections of which were cut out to permit exposure of only the test areas to the sun lamps. Pictures were taekn of the areas exposed to the sun lamps about five to six hours after the exposure. The degree of sunburn was rated on a scale from 1 to 5 with 1 corresponding to no redness and 5 corresponding to extreme redness.

Sun Screen Formulation 3 used in the sunburn protection tests was prepared to contain in weight percent the following:

|  | Percent |
|---|---|
| Acrylic interpolymer | 2 |
| Amyl-O-dimethylaminobenzoate | 3.5 |
| Isopropyl palmitate | 4.7 |
| Dow Corning 473 fluid | 0.47 |
| N,N-diethyl toluamide | 0.06 |
| Water | 12.7 |
| Ethyl alcohol | 76.7 |

Sun Screen Formulation 4 was also used and was identical to Formulation 3 except that the acrylic interpolymer was omitted and replaced with an equal weight of alcohol. For purposes of comparison Coppertone was also used. The test results, clearly show the improved protection provided by Formulation 3.

|  | Average redness rating |
|---|---|
| Formulation 3 | 1.3 (11 subjects) |
| Formulation 4 | 2.7 (15 subjects) |
| Coppertone | 2.9 (15 subjects) |

While the test is subjective the degree of improvement noted with Formulation 3 is substantial and real.

EXAMPLE 3

A more extensive test was made similar to Example 2 using Coppertone and Sun Screen Formulation 3 in which six areas were marked on the back with three of the sections being treated as in Example 2 and after showering the test formulations were applied to the remaining three areas without subjecting them to water exposure. Thus a comparison could be made to determine how much protection had been lost due to showering.

|  | Average redness rating | | |
|---|---|---|---|
|  | Control area | Washed area | Increase in redness |
| Formulation 3 | 1.4 | 2.0 | 0.6 |
| Coppertone | 1.9 | 3.6 | 1.7 |

Again, the results show a significant and real improvement for Formulation 3 (18 subjects) when compared to Coppertone (29 subjects).

Based on tests such as in Examples 1 to 3 and on panel tests sunscreen formulations have been prepared which show great improvements over products commercially available. Preferably these formulations contain from about 0.5 to 3 weight percent of the polymer component and from about 1 to 10 total parts of organic compound per each part of polymer. Sunscreen agents as well as emollients and an insect repellant have been effectively combined into one formulation.

Advantageously, the compositions may contain other additives provided they do not interfere with the basic components or alter their functional features. Thickening agents are especially useful and certain polymers may function in a dual capacity, being a film former and also a thickening agent. A normally solid material which is soluble in the organic compound may also be present in solution.

The novelty of this invention is more apparent when the dried films are examined by means of a scanning electron microscope. With a scanning electron microscope, the object to be photographed is scanned by a very fine electron probe, similar to television, producing a sequential image on the screen of a display cathode tube. With a fast enough scanning rate, the observer can see a complete image of the object. No attempt will be made herein to detail all the rapid advances in this field, but it is important to point out that this new tool is extremely useful in understanding phenomena which have been difficult, if not impossible, to understand before. A brief, but informative, review of the scanning electron microscope can be found in the trade publication, Current Laboratory Practice, December 1968, vol. 1, No. 1, pp. 6-9 (Gelman Instrument Company).

Figure 1:
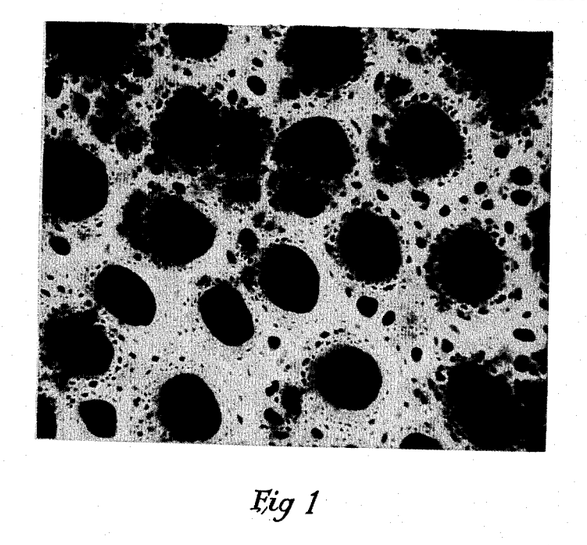
FIG. 1 is a photograph (1500×) of a film made from a solution according to this invention containing a film forming acrylic polymer, sunscreen agents (i.e. the organic compound) and a thickening agent.
Figure 2:
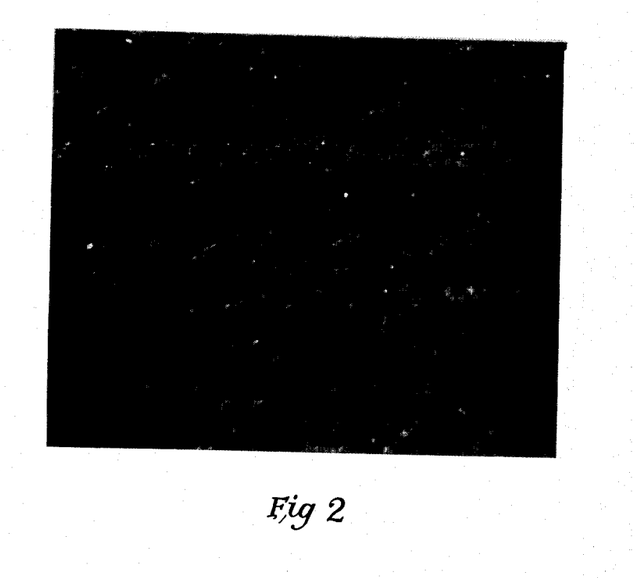
FIG. 2 is a photograph (350×) of a film prepared from the same acrylic polymer but without an organic compound present.

A good comparison between the films of this invention and a continuous film is shown in FIGS. 1 and 2. FIG. 1 is a photograph (1500×) of a film prepared from a composition according to this invention containing 1% of the acrylic interpolymer, 7% homomenthyl salicylate, 0.5% Escalol 506, 0.68% Carbopol 940 neutralized with di-2-ethylhexyl amine, 11% water and the balance ethyl alcohol. The void pattern of the film surface is quite evident and closer examination of the larger holes shows similar holes below the surface. Because the films were exposed to a high vacuum to obtain the picture, no sunscreen agents are present, but normally a substantial portion of the voids would contain said agents. FIG. 2 is a photograph (350×) of a film of the same polymer with only the thickening agent and water present in the formulation. A normal, continuous film is produced.

Figure 3:
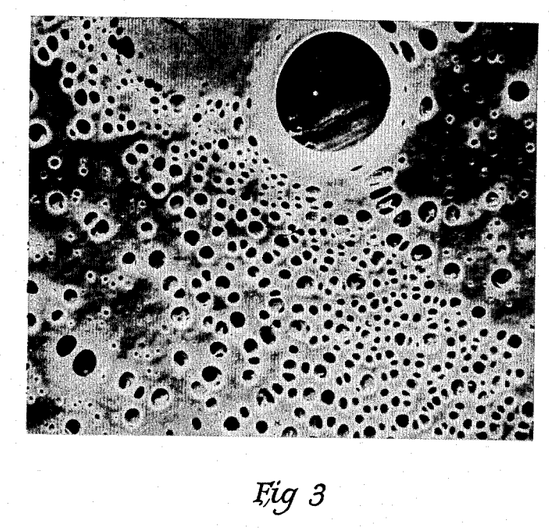
FIG. 3 is a photograph (350×) of a film made from the acrylic polymer and an emollient.
Figure 4:
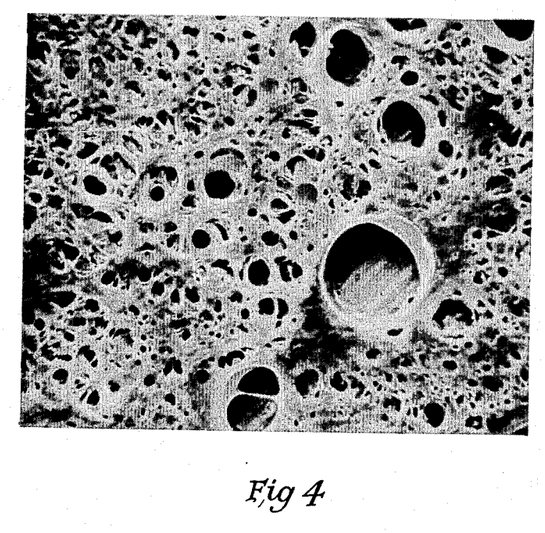
FIG. 4 is a photograph (350×) of a film similar to FIG. 1 but containing no thickening agent.
Figure 5:
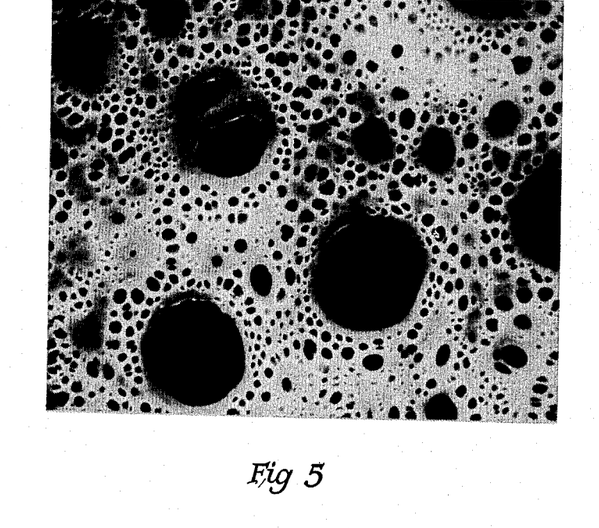
FIG. 5 is a photograph (1500×) of a film similar to FIG. 1.
Figure 6:
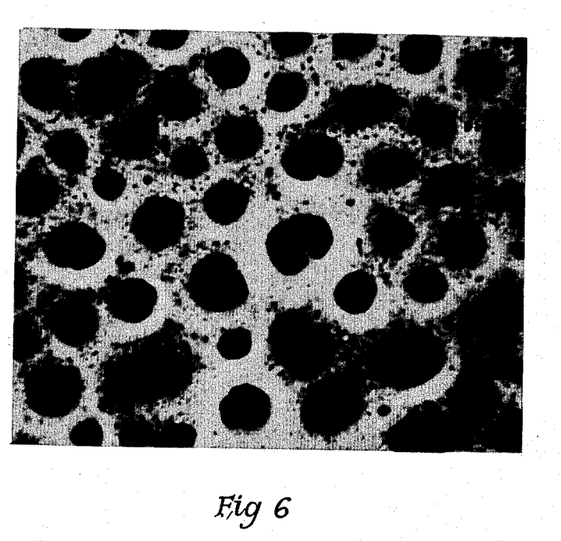
FIG. 6 is a photograph (600×) of a film similar to FIG. 1.

FIG. 3 is a photograph (350×) of another film prepared from a composition containing 2% of the acrylic interpolymer and 5% of isopropyl palmitate dissolved in ethyl alcohol. A void structure similar to that of FIG. 1 is found. A film of a formulation similar to that used for FIG. 1 but containing no thickening agent is shown in the photograph (350×) of FIG. 4 wherein a somewhat different type of void structure is formed in that the voids are more irregular than circular in nature. FIG. 5 is another photograph (1500×) of a film similar to that of FIG. 1 showing the void structure in vivid detail. FIG. 6 is a photograph (600×) of a film of a formulation similar to that of FIG. 1 but containing no added water.

Figure 7:
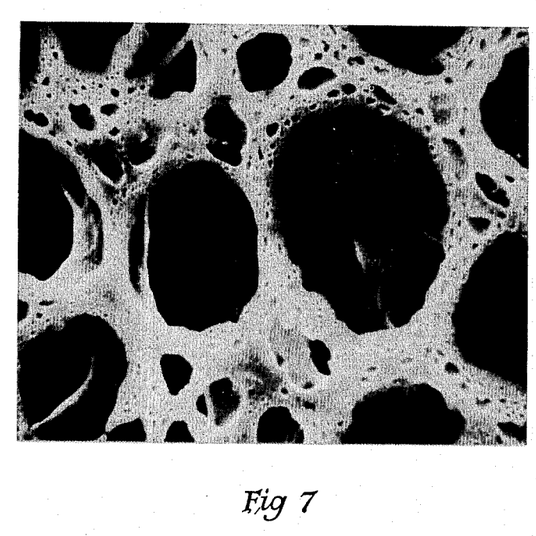
Figure 8:
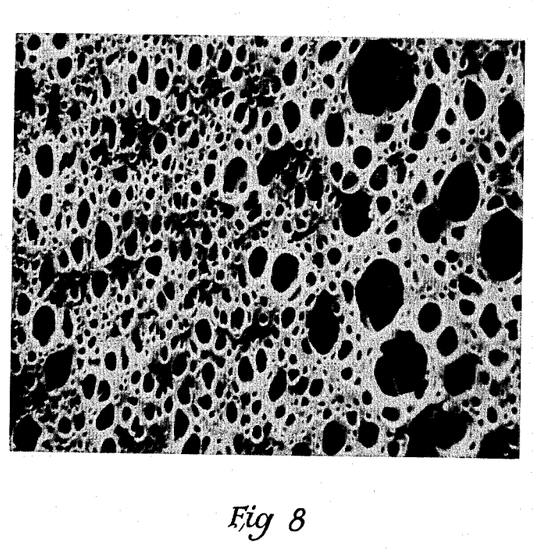
FIG. 8 is a photograph (1500×) of a film similar to FIG. 1 using another commercial acrylic polymer.

FIG. 7 is a photograph (1500×) of a film prepared from a formulation similar to that of FIG. 1 except that the acrylic interpolymer has been replaced by a proprietary, commercially available polymer called Carboset 514 which the manufacturer (B. F. Goodrich Chemical Co.) describes as a low molecular weight acrylic resin. By analysis the polymer contains about 10 weight percent of acrylic acid. A photograph (1500×) of another film similar to FIG. 1 except that the acrylic interpolymer is replaced by 1.6% Carbopol 940 neutralized by di-2-ethylhexyl amine, as shown in FIG. 8.

Figure 9:
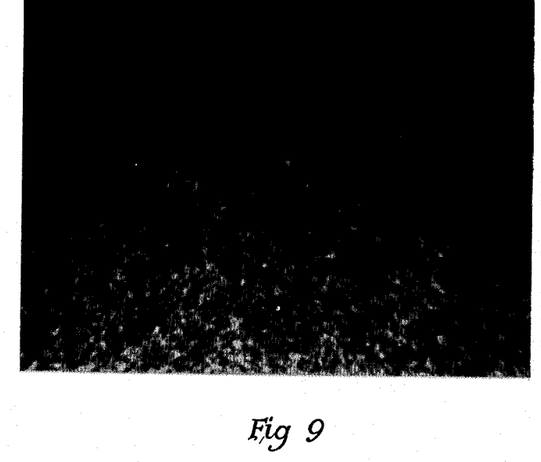
FIG. 9 is a photograph (350×) of a film prepared from a formulation suggested by the art.
Figure 10:
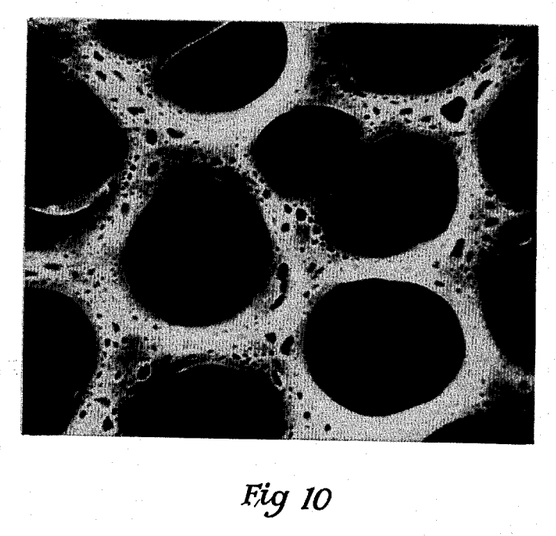
FIG. 10 is a photograph (1500×) of a film similar to FIG. 1 in which the polymer is styrene-ethyl maleate.

For comparison a photograph (350×) is shown in FIG. 9 of a film of a sunscreen lotion suggested in the literature (Drug and Cosmetic Industries, July 1968, p. 156) which contains 6.6% Carboset 514 (polymer basis), 15.4% water, 3% Escalol 506, 10% glycerine and the balance ethyl alcohol (SDA 40). A continuous film results with none of the void characteristics of the films of this invention. FIG. 10 is a photograph (1500×) of a film similar to FIG. 1 in which the acrylic polymer was replaced by a styrene-ethyl acid maleate copolymer.

EXAMPLE 4

The effectiveness of this invention in retaining the fragrance of perfumes was demonstrated by placing one drop of a formulation similar to Sun Screen Formulation 3 on the forearm of a subject and before the drop dried, 1 drop of Arpege perfume was rubbed into the drop. At the same time 1 drop of the perfume was placed on the other forearm. After about 8 hours no trace of the perfume could be found on the control arm but a distinct fragrance was still detectable on the forearm where the perfume was rubbed into the formulation.

EXAMPLE 5

Retention tests were made similar to that of Example 1 in which the area of the skin treated with a sunscreen formulation was exposed to a water spray for 20 minutes at 78° F. Analysis for retention of the sunscreen agents was made in the same manner as before.

One of the polymers used was a commercially available acrylic polymer called Carboset 514 which has been identified to contain ethyl acrylate, methyl methacrylate and acrylic acid. By titration the polymer contains an average of about 10% acrylic acid. A sun screen formulation was prepared to contain in parts by weight about 1 part Carboset 514, 7 parts homomenthyl salicylate, 0.5 part Escalol 506, 0.5 part Carbopol 940, 0.5 part di-2-ethylhexyl amine, 14 parts water and 78.5 parts SDA-40 ethyl alcohol. For comparison Sun Screen Formulation 2 was used.

| Formulation | Absorbence, average | |
|---|---|---|
| | Before | After water exposure |
| Carboset | −0.49 | 0.33 |
| Do | 0.49 | 0.25 |
| No. 2 | 0.45 | 0.27 |
| No. 2 | 0.49 | 0.25 |

EXAMPLE 6

Formulations like those of the previous examples were prepared in which the acrylic interpolymer was replaced by a styrene-ethyl acid maleate copolymer prepared by esterifying a copolymer of styrene-maleic anhydride (48% maleic anhydride) with ethyl alcohol. Retention tests made with these formulations gave similar results.

Additional substitutions for the acrylic interpolymer were made obtaining similar results with the following polymers:

(a) An equal molar ethylene/maleic acid copolymer,
(b) An equal molar styrene/maleic acid copolymer,
(c) An equal molar methyl vinyl ether/maleic acid copolymer,
(d) An equal molar methyl vinyl ether/maleic acid half ethyl ester copolymer,
(e) An interpolymer of 10% lauryl methacrylate, 20% methyl methacrylate (NMA), 20% ethyl acrylate (EA), 25% methacrylic acid (MAA) and 25% methyl acrylate (MA),
(f) An interpolymer of 10% of a methacrylic acid monoester of a polypropylene glycol (10 PO units), 25% MAA, 20% MMA, 20% EA and 25% MA, and
(g) An interpolymer of 10% of an acrylic acid monoester of a polyethylene glycol (20 EO units), 25% MAA, 30% MMA and 35% EA.

The compositions are prepared in a volatile organic solvent which is a mutual solvent for the polymer and the organic compound. A variety of solvents may be used herein with the selection of the solvent dependent on the components and the end use. Formulations designed for human use should of course use a non-toxic solvent. In this respect, lower alcohols, especially ethyl alcohol, are especially suitable. Mixtures of various organic solvents may also be employed.

Especially useful is a mixed solvent of a water soluble organic solvent, such as lower alcohols (ethyl alcohol, etc.) and water. When more than trace amounts of water are present, the organic compound must also be insoluble in water. For example, when the organic solvent is a mixture of ethyl alcohol and a glycol ether such as diethylene glycol monomethyl ether the final formulation may contain as much as 45 weight percent water without phasing out the organic compound which remains solubilized by the organic solvents. Generally lower amounts of water, preferably up to about 15 weight percent may be employed.

Numerous ways of applying the compositions to a substrate may be used such as spraying, brushing, dipping, etc., and said compositions may be thickened so that they may be readily spread by hand. It has been found to be of advantage to apply by rubbing, etc. since the application of a shearing force produces a more regular, finer void structure in the final film and accordingly better distribution of the organic compound throughout the film.

What is claimed is:

1. A composition capable of forming a coherent polymeric film a major portion of which comprises a non-volatile liquid organic compound retained therein, said film having a multiplicity of voids which contain therein said organic compound, said composition comprising a solution of a film-forming organic polymer and at least one of said organic compounds in a volatile mutual organic solvent therefor; wherein the total parts by weight of organic compound to polymer is about 1:1 to 10:1, respectively, wherein said polymer is more soluble in said solvent than is the organic compound, wherein said organic compound is a liquid at ambient temperature and is essentially a non-solvent and a non-plasticizer for the polymer.

2. A composition according to claim 1 wherein the organic compound is water insoluble and the organic solvent is water soluble and wherein the composition further contains up to about 45 weight percent of water.

3. A composition according to claim 2 containing up to about 15 weight percent water.

4. A composition according to claim 1 wherein the solution contains about 0.5 to about 3 weight percent of said polymer and the weight proportion of said organic compound to polymer is about 1:1 to 5:1.

5. A composition according to claim 1 wherein said polymer is a vinyl addition polymer.

6. A composition according to claim 5 wherein said polymer contains about 5 to 30 weight percent of a carboxylic acid group.

7. A composition according to claim 6 wherein said polymer is an acrylic interpolymer containing in polymerized form a vinyl carboxylic acid monomer.

8. A composition according to claim 7 wherein said polymer is an interpolymer of ethyl acrylate, methyl, methacrylate, methyl acrylate and methacrylic acid.

9. A composition according to claim 6 wherein said polymer is a copolymer of a monovinyl acromatic monomer and an alkyl half ester of an unsaturated dicarboxylic acid.

10. A composition according to claim 9 wherein said polymer is a copolymer of styrene and ethyl acid maleate.

11. A composition according to claim 1 wherein said solvent is an alcohol.

12. A process for preparing a coherent film a major portion which comprises a non-volatile liquid organic compound retained therein, said film having a multiplicity of voids which contain therein said organic compound, said process comprising forming a film of a solution of a film-forming organic polymer and at least one of said organic compounds in a volatile, mutual organic solvent therefor and drying said film; wherein the total parts by weight of organic compound to polymer is about 1:1 to 10:1, respectively, and wherein said polymer is more soluble in said solvent than is the organic compound, wherein said organic compound is a liquid at ambient temperature and is essentially a non-solvent and a non-plasticizer for the polymer.

13. A process according to claim 12 wherein the organic compound is water insoluble and the organic solvent is water soluble and wherein the solution further contains up to about 45 weight percent of water.

14. A process according to claim 13 wherein the solution contains up to about 15 weight percent water.

15. A process according to claim 12 wherein the solution contains about 0.5 to about 3 weight percent of said polymer and the weight proportion of said organic compound to polymer is about 1:1 to 5:1.

16. A process according to claim 12 wherein said polymer is a vinyl addition polymer.

17. A process according to claim 16 wherein said polymer contains about 5 to 30 weight percent of a carboxylic acid group.

18. A process according to claim 17 wherein said polymer is an acrylic interpolymer containing in polymerized form a vinyl carboxylic acid monomer.

19. A process according to claim 18 wherein said polymer is an interpolymer of ethyl acrylate, methyl methacrylate, methyl acrylate and methacrylic acid.

20. A process according to claim 17 wherein said polymer is a copolymer of a monovinyl acromatic monomer and an alkyl half ester of an unsaturated dicarboxylic acid.

21. A process according to claim 20 wherein said polymer is a copolymer of styrene and ethyl acid maleate.

22. A process according to claim 12 wherein said solvent is an alcohol.

References Cited

UNITED STATES PATENTS

| | | | |
|---|---|---|---|
| 2,894,289 | 7/1959 | Harper et al. | 260—2.5 M |
| 3,450,650 | 6/1969 | Murata | 260—2.5 M |

OTHER REFERENCES

"Carbopol Water Soluble Resins," B. F. Goodrich Chem. Co., p. 27.

MURRAY TILLMAN, Primary Examiner

M. FOELAK, Assistant Examiner

U.S. Cl. X.R.

260—2.5 R, 29.6 TA, 29.6 E, 29.6 HN, 29.6 NR